(12) United States Patent
Chae et al.

(10) Patent No.: US 8,911,319 B2
(45) Date of Patent: Dec. 16, 2014

(54) DIAL RECLINER

(75) Inventors: Su Min Chae, Incheon (KR); Won Kee Kim, Seoul (KR)

(73) Assignee: Austem Co., Ltd., Cheonan-si (KR)

( * ) Notice: Subject to any disclaimer, the term of this patent is extended or adjusted under 35 U.S.C. 154(b) by 0 days.

(21) Appl. No.: 13/509,841

(22) PCT Filed: Nov. 23, 2011

(86) PCT No.: PCT/KR2011/008944
§ 371 (c)(1),
(2), (4) Date: May 15, 2012

(87) PCT Pub. No.: WO2012/121471
PCT Pub. Date: Sep. 13, 2012

(65) Prior Publication Data
US 2013/0334858 A1    Dec. 19, 2013

(30) Foreign Application Priority Data
Mar. 9, 2011  (KR) .......................... 11-2011-0020705

(51) Int. Cl.
*F16H 1/32* (2006.01)
*B60N 2/225* (2006.01)

(52) U.S. Cl.
CPC .......... *B60N 28/2213* (2013.01); *B60N 2/2252* (2013.01); *B60N 2/2254* (2013.01)
USPC .......................................... 475/175; 475/162

(58) Field of Classification Search
CPC ......... F16H 1/32; F16H 57/082; F16H 57/08; B60N 2/2252; B60N 2/2254; B60N 2/2255
USPC .................... 475/162, 163, 175, 331
See application file for complete search history.

(56) References Cited

U.S. PATENT DOCUMENTS

| 7,090,298 | B2 * | 8/2006 | Lange ........................... | 297/362 |
| 8,128,169 | B2 * | 3/2012 | Narita et al. .................. | 297/362 |
| 8,360,525 | B2 * | 1/2013 | Cha et al. ..................... | 297/362 |
| 8,424,970 | B2 * | 4/2013 | Ito ................................ | 297/362 |
| 2006/0290187 | A1 * | 12/2006 | Scholz et al. ................ | 297/362 |
| 2007/0108824 | A1 * | 5/2007 | Lange ........................... | 297/367 |
| 2008/0061616 | A1 * | 3/2008 | Wahls et al. .................. | 297/362 |
| 2011/0169312 | A1 * | 7/2011 | Desquesne et al. ........... | 297/362 |
| 2011/0193391 | A1 * | 8/2011 | Mitsuhashi ................ | 297/354.1 |
| 2012/0001471 | A1 * | 1/2012 | Wei ............................... | 297/362 |

FOREIGN PATENT DOCUMENTS

| KR | 1020100038820 A | 4/2010 |
| KR | 1020100113838 A | 10/2010 |

* cited by examiner

*Primary Examiner* — Justin Holmes
(74) *Attorney, Agent, or Firm* — Schmeiser, Olsen & Watts LLP

(57) ABSTRACT

The dial recliner includes a holder and a sector gear and also comprises a brake spring, a cam, a pair of clutch shoes and a spring which are accommodated and supported between the holder and the sector gear. The dial recliner also comprises a housing to maintain a combined state between the holder and the sector gear. The holder has inner teeth of a ring shape at its outer circular part and a boss at its center part to support a shaft. The sector gear has outer teeth to intermesh with the inner teeth of the holder. When intermeshed, the boss of the holder and a shaft hole of the sector gear become eccentric between their centers. The clutch shoe is supported by the brake spring which is elastically held around the boss of the holder so that a circular drifting movement of the clutch shoe can be prevented.

3 Claims, 6 Drawing Sheets

DIAL RECLINER

TECHNICAL FIELD

The present invention relates to a recliner mounted to a vehicle seat to enable a seatback to rotate with respect to a seat cushion and more particularly to a dial recliner where a rotating angle of the seatback is adjusted according to dialing of a knob connected to the recliner.

BACKGROUND ART

Conventionally, a dial recliner has a holder and a sector gear which have inner teeth and outer teeth with different teeth numbers therebetween.

Generally, it is common in the principal aspect that the sector gear rotates on its own axis as well as it revolves in the holder in a state that the sector gear intermeshes with the inner teeth of the holder, so that the seatback which is integrally coupled to the sector gear can rotate.

However, a conventional dial recliner has a complicated structure and a lot of parts and components are required to make a manufacturing process complicated.

Especially, according to the conventional dial recliner, the seatback becomes turned back gradually as it is released little by little from its fixed position due to a repeated pressure or impact on the seatback.

It has been widely known that cause of such a problem is a drifting movement, which is called chattering, of a clutch shoe (refer to FIG. 1) among the components constituting the dial recliner that is interposed between the holder and the sector gear.

DISCLOSURE

Technical Problem

An object of the present invention is to provide a dial recliner which has a simple structure with a small number of the components compared to the conventional art to simplify the manufacturing process, especially which can prevent the drifting movement of the clutch shoe among the components so that, when it is mounted to a seat, the seatback can be prevented from turning back gradually due to an outer impact or etc.

Technical Solution

In order to accomplish the above object, the present invention provides a dial recliner comprising: a holder having inner teeth at its outer circular part and a boss at its center part; a sector gear having outer teeth at its outer circular part which intermeshes with the inner teeth of the holder so that the sector gear can roll in the holder, and a circular receiving part which has its center eccentric from a center of the boss and surrounds the boss; a brake spring of a ring shape elastically held around an outer surface of the boss of the holder and having a pair of protruding ends which are separated therebetween in a circular direction with a predetermined angle; a bearing inserted in the receiving part of the sector gear to be supported in a radial direction and receiving therein the boss whose center is eccentric from that of the bearing; a cam having a center shaft part which is inserted into the boss, an operating cam part which adjoins an inner surface of the bearing and a spring operating part which is interposed between a pair of the protruding ends of the brake spring; and a pair of clutch shoes radially interposed between the brake spring and the bearing and circularly interposed between the operating cam part and one of the protruding ends respectively.

According to an aspect of the present invention, the cam further has a supplementary cam part which is formed at the exact opposite side of the operating cam part and circularly interposed between a pair of the clutch shoes.

According to an aspect of the present invention, the supplementary cam part is located at an outer side of the spring operating part and formed integrally with the spring operating part.

Advantageous Effects

According to the dial recliner of the present invention as described above, the structure of the dial recliner is simplified with a small number of the components thus simplifying the manufacturing process, especially the clutch shoe is supported by a brake spring which is elastically held around a boss of the holder so that a circular drifting movement of the clutch shoe can be prevented. Therefore, a phenomenon that the seatback is turned back gradually in use can be prevented.

BEST MODE

Figure 1:
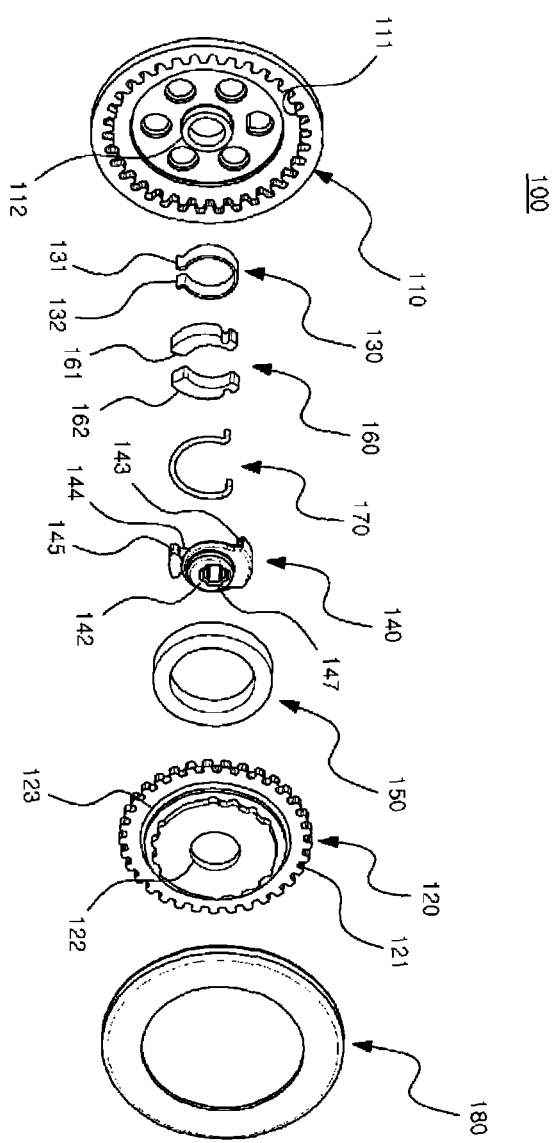
FIG. 1 is an exploded perspective view of a dial recliner according to an exemplary embodiment of the present invention.

As shown in FIG. 1, a dial recliner 100 according to an exemplary embodiment of the present invention comprises a holder 110 and a sector gear 150 and also comprises a brake spring 130, a cam 150, a pair of clutch shoe 160 and a spring 170 which are accommodated and supported between the holder 110 and the sector gear 120. The dial recliner 100 also comprises a housing 180 to maintain a combined state between the holder 110 and the sector gear 120.

The holder 110 has inner teeth 111 of a ring shape at its outer circular part and a boss 112 at its center part to support a shaft.

The sector gear 120 has outer teeth 121 at its outer circular part to intermesh with the inner teeth 111 of the holder 110.

In this case, a pitch circle of the outer teeth 121 has a smaller radius than the inner teeth 111 and the number of the teeth formed in the outer teeth 121 is fewer than that of the teeth formed in the inner teeth 111 by one.

Accordingly, when the holder 110 intermeshes with the sector gear 120, the boss 112 of the holder 110 and a shaft hole 122 of the sector gear 120 become eccentric between their centers.

Around the shaft hole 122 is formed a circular receiving part 123 with a predetermined radius to make a raised surface.

The brake spring 130 is a spring of a ring shape by forming a band into the ring shape and has a pair of protruding ends 131 and 132 which are separated therebetween in a circular direction with a predetermined angle.

Figure 2:
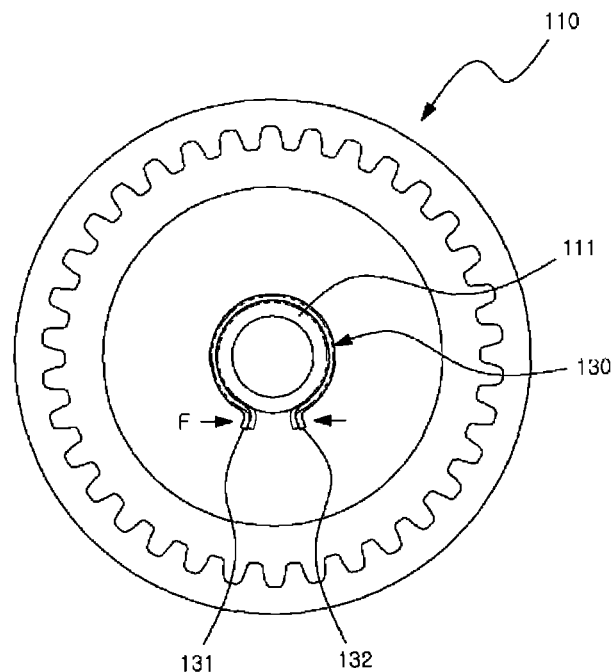
FIG. 2 is a plan view of a combined state of a holder and a brake spring in the dial recliner of FIG. 1.

As shown in FIG. 2, the brake spring 130 is elastically held around an outer surface of the boss 112 of the holder 110 in a state of widening the protruding ends 131 and 132.

Accordingly, the boss 112 closely contacts the brake spring 130 by an elastic restoring force F from the brake spring 130.

Figure 5:
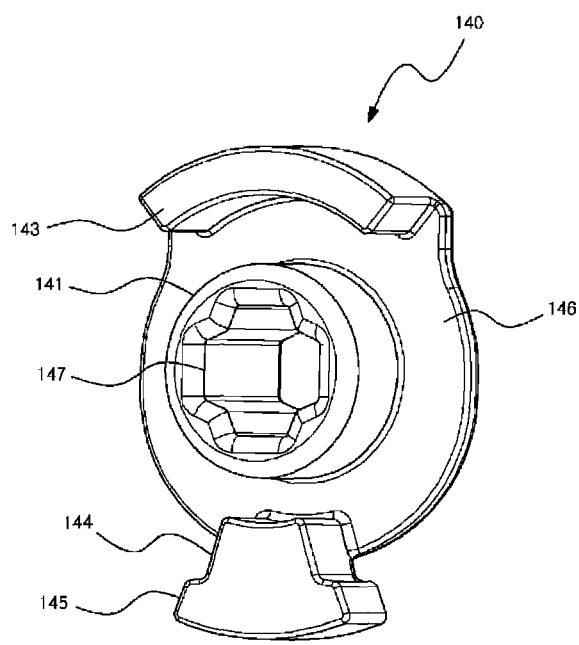
FIG. 5 is a perspective view of a cam constituting a component of the dial recliner of FIG. 1 when shown from the opposite side.

As shown in FIG. 1 and FIG. 5, the cam 140 has at its axially both sides a center shaft part 141 (see FIG. 5) and an eccentric shaft part 142 (see FIG. 1) which are eccentric between their centers.

An operating cam part 143, a spring operating part 144 and a supplementary cam part 145 are integrally extended between the center shaft part 141 and the eccentric shaft part 142.

The operating cam part 143 protrudes from a base surface 146 to the left direction, that is the same direction where the center shaft part 141 protrudes, together with the spring operating part 144 and the supplementary cam part 145.

However, the eccentric shaft part 142 protrudes from the base surface 146 to the opposite, that is, the right direction.

The center shaft part 141 at the left side is inserted into the boss 112 of the holder 100 to rotate therein and the eccentric shaft part 142 at the right side is inserted into the shaft hole 121 of the sector gear 120 to rotate therein.

Also, the cam 140 has a through hole 147 which penetrates the center shaft part 141 and the eccentric shaft part 142 in common and has the same center as the center shaft part 141. The through hole 147 has a cross section of a cross shape and a shaft of a rotary knob (not shown) is inserted into the through hole 147 to enable adjusting a rotation of the dial recliner 100.

As shown in FIG. 1, a side part (right part in FIG. 1) of the bearing 150 having a shape of a ring is inserted into the receiving part 123 of the sector gear 120 to be supported by the sector gear 120 in the radial direction.

The boss 112 of the holder 110 is received in the bearing 150 to be apart from the bearing 150 and has its center to be eccentric from that of the bearing 150.

A pair of the clutch shoes 160 together with the cam 140 are inserted into a space between the boss 112 and the bearing 150.

Figure 3:
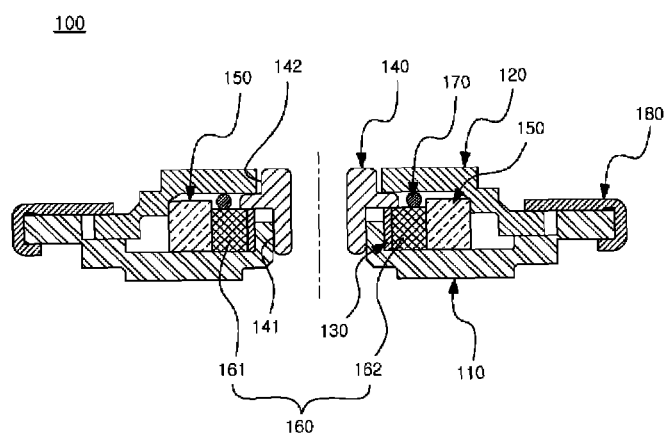
FIG. 3 is a side sectional view of an assembled state of the dial recliner of FIG. 1.

A pair of the clutch shoes 160 a clutching means for performing locking and unlocking the sector gear 120 to the holder 110 through the bearing 150. As shown in FIG. 3, they are inserted between the bearing 150 at an outer side and the brake spring 130 holding the brake spring 130 at an inner side.

Such a pair of the clutch shoes 160 act as one-way clutches which exert stopping forces in the opposite directions therebetween.

Figure 6:
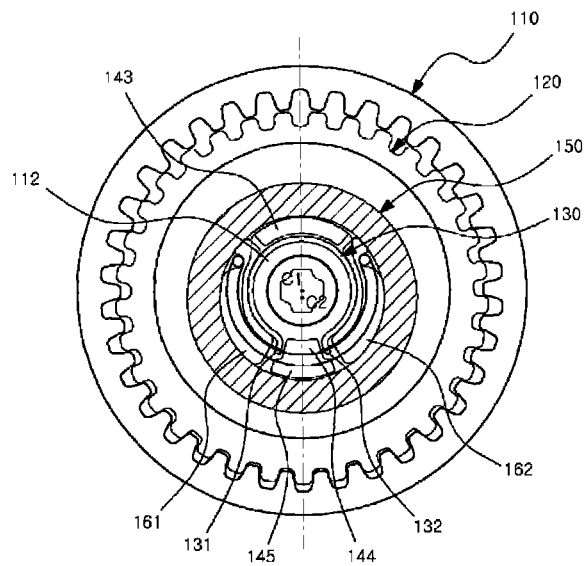
FIG. 6 is a front sectional view of the assembled state of the dial recliner of FIG. 1.

FIG. 6 shows an inside of an assembled state of the dial recliner 100 in FIG. 1. Each of the clutch shoes 161 and 162 is located between the operating cam part 143 and one of the protruding ends 131 and 132 in the circular direction.

The clutch shoes 161 and 162 are supported by the spring 170 (see FIG. 1 and FIG. 6).

As shown in FIG. 3, the housing 180 rotatably supports the sector gear 120 with one end surface elongated in the central direction and covers an outer circular part of the holder 110 with the other end surface elongated in the radial direction.

Figure 4:
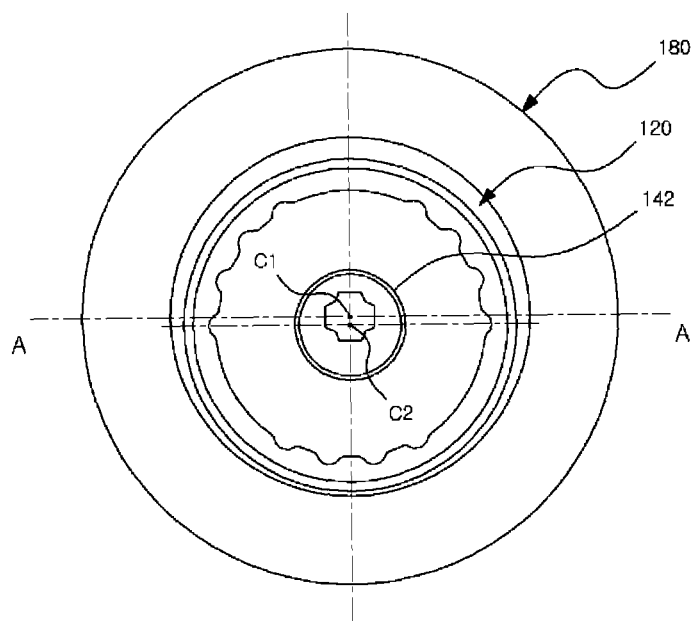
FIG. 4 is a front view of the assembled state of the dial recliner of FIG. 1 (where, the side sectional view of FIG. 3 is drawn along AA line in FIG. 4)

FIG. 4 is a front view of an assembled state of the dial recliner 100 of FIG. 1. The center of the holder 110 (see FIG. 1) is C1 and the center of the sector gear 120 is C2 which is also the center of the eccentric center part 142. C2 is located at a distance downwardly from the C1.

FIG. 3 is a side sectional view of the dial recliner which is cut along AA line in FIG. 4.

Referring to FIG. 3 and FIG. 4, when the cam 140 rotates, the eccentric shaft part 142 rotates around C1. Also, the center C2 of the eccentric shaft part 142 rotates around C1. The sector gear 120 which has a rotation center at C2 revolves around C2 as well as it rotates around C1.

That is, the sector gear 120 rolls in the holder 110 to maintain its state of intermeshing with the inner teeth of the holder 110 (refer to FIG. 1 and FIG. 6).

Referring to FIG. 6, the spring operating part 144 of the cam 140 interposes between a pair of the protruding ends 131 and 132 of the brake spring 130.

The supplementary cam part 145, which extends integrally from an outer side of the spring operating part 144, extends in a circular direction and passes the protruding ends 131 and 132 to face a pair of the clutch shoes 161 and 162.

Figure 7:
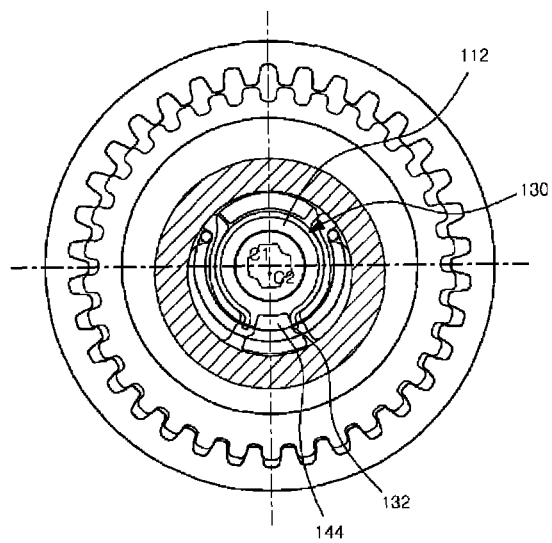
FIG. 7 and FIG. 8 show a step by step rotation of the cam in the dial recliner of FIG. 6.

Hereinafter is described an operation of the dial recliner 100. If the cam 140 is rotated counterclockwise from its stationary state of FIG. 6, the spring operating part 144 presses at its right side the protruding end 132 as shown in FIG. 7. Then, a holding force of the brake spring 130 on the boss 112 is released and the brake spring 130 gets rotated together.

Figure 8:
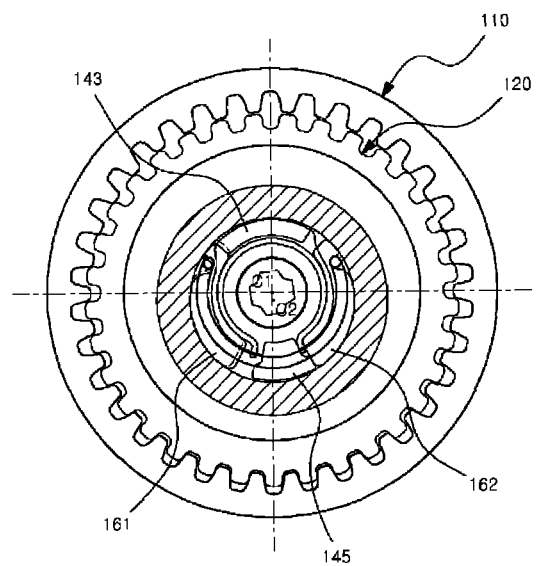
Figure 9:
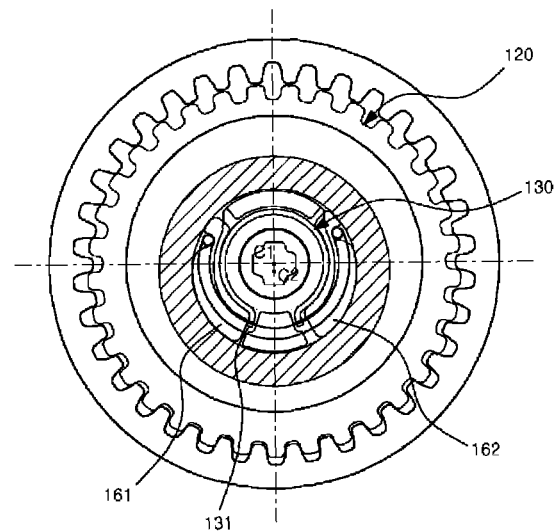
FIG. 9 shows a situation when there is a chattering phenomenon of the clutch shoe in the dial recliner of FIG. 6.

With an additional rotation, as shown in FIG. 8, the operating cam part 143 at the upper side presses and rotates an upper end of the left clutch shoe 161 counterclockwise (unlocking). Almost at the same time, the supplementary cam part 145 at the lower side also presses and rotates a lower end of the right clutch shoe 162.

If the eccentric center C2 rotates due to the rotation of the cam 140, the sector gear 120 revolves itself as well as it rolls in the holder 110 to make a rotation (reclining) of the seatback which is integrally coupled to the sector gear 120.

If the clutch shoe 161 has a drift movement, that is, chattering due to an outer impact or vibration onto the seatback, the protruding end 131 of the brake spring 130 supports and prevents the clutch shoe 161.

Therefore, a rotation of the sector gear 120 due to the chattering of the clutch shoes 161 and 162 can be prevented.

If the brake spring 130 does not exist, the supplementary cam part 145 is pressed by the chattering clutch shoe 161 and whole cam 140 is rotated a little resulting in the rotation of the sector gear 120.

Although the exemplary embodiment of the present invention has been disclosed, various modifications, additions and substitutions are possible, without departing from the scope and spirit of the invention. Therefore, the above embodiment must be regarded as one example provided for description of the present invention, rather than to limit the present invention.

The invention claimed is:

1. A dial recliner comprising:
a holder having inner teeth at its outer circular part and a boss at its center part;
a sector gear having outer teeth at its outer circular part which intermeshes with the inner teeth of the holder so that the sector gear can roll in the holder, and a circular receiving part which has its center eccentric from a center of the boss and surrounds the boss;
a brake spring of a ring shape elastically held around an outer surface of the boss of the holder and having a pair of protruding ends which are separated therebetween in a circular direction with a predetermined angle;

a bearing inserted in the receiving part of the sector gear to be supported in a radial direction and receiving therein the boss whose center is eccentric from that of the bearing;

a cam having a center shaft part which is inserted into the boss, an operating cam part which adjoins an inner surface of the bearing and a spring operating part which is interposed between a pair of the protruding ends of the brake spring; and a pair of clutch shoes radially interposed between the brake spring and the bearing and circularly interposed between the operating cam part and one of the protruding ends respectively.

2. The dial recliner according to claim 1, wherein the cam further has a supplementary cam part which is formed at the exact opposite side of the operating cam part and circularly interposed between a pair of the clutch shoes.

3. The dial recliner according to claim 2, wherein the supplementary cam part is located at an outer side of the spring operating part and formed integrally with the spring operating part.

\* \* \* \* \*